Oct. 14, 1958 T. O. KOSATKA 2,856,219
FLUID SEAL
Filed July 7, 1954
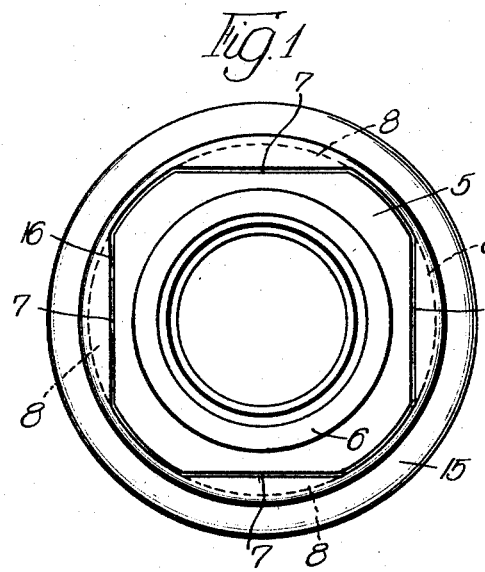
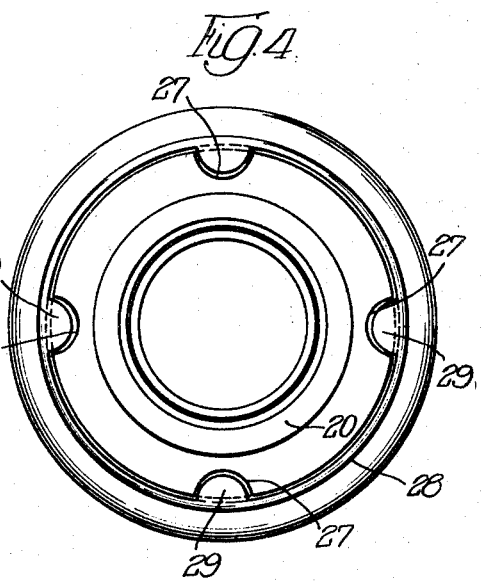
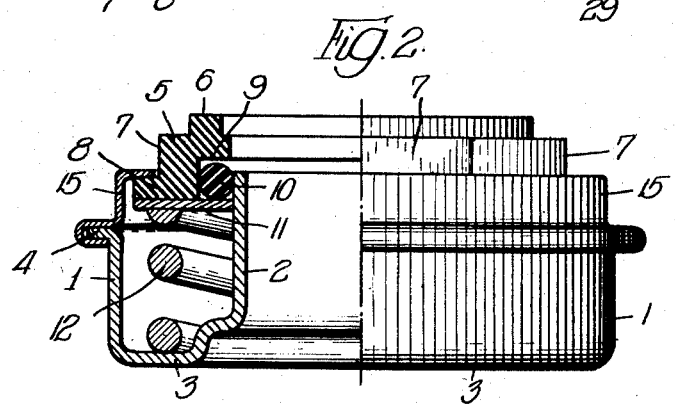
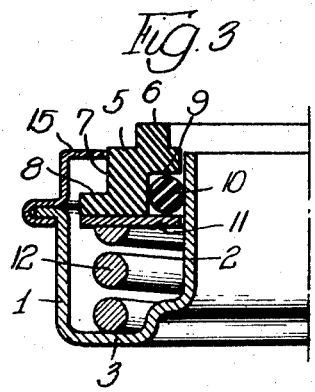
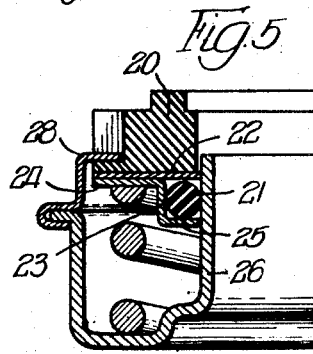
INVENTOR.
Thomas O. Kosatka,
BY George F. Haight &
George H. Simmons

United States Patent Office 2,856,219
Patented Oct. 14, 1958

2,856,219

FLUID SEAL

Thomas O. Kosatka, Chicago, Ill., assignor to Victor Manufacturing & Gasket Co., Chicago, Ill., a corporation of Illinois Application July 7, 1954, Serial No. 441,876

2 Claims. (Cl. 288—3)

This invention relates to fluid seals and has for its principal object the provision of a new and improved device of this kind.

It is a main object of the invention to provide a face type seal for forming a fluid tight seal between a radial face on a rotatable shaft and a housing member through which the shaft projects.

Another object of the invention is to provide a face type seal that is a self-contained unitary structure.

Another object of the invention is to provide a face type seal in which an elastomer O-ring is employed to form a fluid tight seal between the shell of the device and the sealing ring which engages the radial face on the shaft to form a fluid tight seal therewith.

Another object of the invention is to provide a face type seal that can be manufactured at low cost without sacrificing quality.

Further objects of the invention not specifically mentioned here will be apparent from the detailed description and claims which follow, reference being had to the accompanying drawings in which a preferred embodiment of the invention is shown by way of example and in which:

Fig. 1 is a plan view of the preferred form of seal;

Fig. 2 is an elevational view, in quarter section, of the seal shown in Fig. 1, drawn to an enlarged scale;

Fig. 3 is a fragmentary sectional view showing the seal compressed to operating position;

Fig. 4 is a plan view of a modified form of seal; and

Fig. 5 is a fragmentary elevational view in cross section of the seal shown in Fig. 4.

In many mechanical devices, such as pumps, a rotating shaft projects through a bore in a housing member and contains a radial flat face adjacent that member. To form a fluid tight joint between the shaft and member, a so-called face type seal is employed, and it is to seals of this type that the present invention particularly relates.

The seal, which is a self-contained unit, has a shell adapted to fit into the bore in the housing member and form a fluid tight seal therewith. Carried in the shell is a sealing ring usually composed of a low friction material and containing a flat face adapted to engage the shoulder on the shaft and form a fluid tight seal therewith. The device also contains spring means for keeping the sealing ring tightly in engagement with the shoulder notwithstanding that there may be a certain amount of end play in the shaft. The device also is equipped with means for forming a fluid tight seal between the sealing ring and shell or casing of the device.

The seal of the present invention consists of a shell having inner and outer coaxial cylindrical walls, the outer one of which is flanged and of such dimension as to form a fluid tight seal with the housing member. The inner cylindrical wall encircles the shaft and is spaced therefrom. Preferably the shell is composed of metal, although the use of other materials such as thermosetting plastics is contemplated within the teachings of the invention. A sealing ring is fitted between the inner and outer walls and an elastomer O-ring is employed to form a fluid tight seal between the sealing ring and inner cylindrical wall. Spring means are employed to maintain the sealing ring tightly in engagement with the shoulder on the shaft, and cap means are employed to hold the device together as a unitary structure and to prevent rotation of the sealing ring with respect to the shell.

The invention will be best understood by reference to the drawings, particularly Figs. 1, 2 and 3, where it will be seen that the seal of the present invention comprises a shell having an outer cylindrical wall 1, an inner cylindrical wall 2, joined thereto by an annular wall 3. A flange 4 projects radially outwardly from the free end of the outer wall 1. Fitted within the space between the inner and outer walls in a sealing ring 5 having a flat sealing face 6 adapted to engage the shoulder on the shaft to form a fluid tight seal therewith. Preferably the ring 5 is composed of a low friction material capable of taking a high polish, such as graphite or a synthetic resin composition. The outer edge of the ring 5 contains flat walls 7 that extend part way through the ring, the remainder forming flanges 8 that project radially outwardly from the walls 7.

Formed in the inner edge of the ring 5 is a groove 9 in which is disposed an elastomer O-ring 10 which engages the ring 5 and the inner cylindrical wall 2 of the shell to form a fluid tight seal therewith. A rigid washer 11 engages the inner face of the ring 5 and projects into close proximity to the inner cylindrical wall 2 and serves to hold the O-ring in proper position relative to the sealing ring 5. A spring 12 abutting against the annular wall 3 of the shell and the washer 11 is maintained under compression and tends to force the washer, O-ring and sealing ring outwardly of the shell. Attached to the flange 9 is a cap member 15, preferably composed of metal, which overlies the flanges 8 on the ring 5 and has a square opening 16 through which the flat walls 7 of the ring project. The cap engages the flanges 8 holding the device together as a unitary structure and prevents rotation of the ring with respect to the shell.

When the device thus formed is fitted in the bore in the housing, the outer wall 1 forms a fluid tight seal therewith, the device being positioned axially in the bore by engagement of the flange 4 with the member. The shoulder on the shaft forces the sealing ring, O-ring and washer inwardly of the shell into working position shown in Fig. 3. The O-ring 10 travels along the inner cylindrical wall 2 to maintain a fluid tight seal in all positions of the sealing ring. It will be noted from Fig. 3 that there is an appreciable space between the flange 8 on the sealing ring and the overhanging portion of the cap 15, so that the shaft and shoulder thereon may have an appreciable amount of end play without breaking the seal between the sealing face 6 and shoulder on the shaft.

In the embodiment of the invention shown in Figs. 4 and 5, the same general combination of parts will be found; however, the sealing ring 20 is not provided with an inwardly opening groove, but rather the O-ring 21 is disposed inwardly of the shell adjacent the inner face of the sealing ring 20. A sealing washer 22, formed of a resilient material that is impervious to the liquids with which it will come in contact, is disposed against the inner face of the sealing ring 20. A metallic member is employed to hold the O-ring against ring 20 and consists of a cylindrical wall 23, from one end of which an annular wall 24 projects outwardly in engagement with the sealing washer 22. From the opposite end of the cylindrical wall 23 is a second annular wall 25 projecting inwardly into close proximity with the inner cylindrical wall 26 of the shell. Thus a groove for the O-ring 21 is formed by the sealing washer 22 and portions 23 and 25 of the metallic member.

The sealing ring 20 in this embodiment of the invention is provided with substantially semi-cylindrical indentations 27 shown to be four in number, and the retaining cap 28, which is fixed onto the flange of the outer shell as before, contains substantially semi-circular ears 29 which project into the indentations 27 to hold the device together as a unitary structure and to prevent rotation of the sealing ring 20 with respect to the shell.

The device of the present invention is possessed of many advantages. In its preferred form the sealing ring can be molded to final shape and the metallic parts can be cheaply made and economically assembled together. The elastomer O-ring forms an efficient long life seal between the sealing ring and inner cylindrical wall of the shell, traveling along that wall as the sealing ring moves to compensate for end play in the shaft.

While I have chosen to illustrate my invention by showing and describing a preferred embodiment of it, I have done so by way of example only, as there are many modifications and adaptations which can be made by one skilled in the art within the teachings of the invention.

Having thus complied with the statutes and shown and described a preferred embodiment of my invention, what I consider new and desire to have protected by Letters Patent is pointed out in the appended claims.

What I claim is:

1. A device for forming a fluid tight seal between a radial face on a rotatable shaft and a bore in a stationary member through which the shaft projects, comprising: a shell consisting of an outer cylindrical wall adapted to fit in the bore and to form a fluid tight seal therewith; a flange projecting radially outwardly from one end of said wall and engageable with said member to position the wall axially in the bore, an annular wall projecting radially inwardly from the other end of said outer wall; an inner cylindrical wall extending from the inner edge of said annular wall coaxially of said outer wall to and through the plane of said flange; a molded sealing ring surrounding said inner cylindrical wall and consisting of an annular portion adapted to form a seal with the shaft face, a substantially square portion extending from said annular portion into the space between said inner and outer shell walls, flanges projecting radially outwardly from said square portion into juxtaposition to said outer shell wall, a groove opening inwardly of the sealing ring defined by a cylindrical wall spaced outwardly from the inner edge of the ring and a radial wall extending from one end of the cylindrical wall to said edge; an elastic O-ring disposed in said groove and engaging the inner cylindrical wall of said shell to form a seal between the sealing ring and shell; a rigid washer engaging the sealing ring and extending alongside the O-ring to retain the O-ring in said groove; a compression spring engaging the washer and annular shell wall to urge the rings outwardly with respect to the shell; and a cap fixed to the flange on the shell which cap contains a substantially square perforation and engages the flange and square portion of the sealing ring to hold the device together as a unit and to prevent rotation of the sealing ring with respect to the shell.

2. A device for forming a fluid tight seal between a radial face on a rotatable shaft and a bore in a stationary member through which the shaft projects, comprising: a metallic shell having coaxial inner and outer cylindrical walls joined together at one end by a radial wall; a flange projecting radially outwardly from the outer wall at the free end thereof; a sealing ring composed of a low friction material surrounding said inner wall and comprising: a narrow annulus adapted to form a seal with the radial face on the shaft; a base portion extending into the space between said inner and outer walls and having oppositely disposed radially outwardly facing planar faces; and flanges projecting outwardly from the base portion and terminating in a cylindrical wall whose diameter is less than the inner diameter of the outer wall of the shell, said base portion containing a recess opening inwardly towards the inner cylindrical wall of the shell and rearwardly towards the radial wall thereof; an elastomer O-ring in said recess engaging the inner cylindrical wall of the shell and forming a fluid tight seal between that wall and said base portion; a metallic washer engaging said base portion and extending alongside the O-ring to retain the O-ring in said recess; and a cap fixed to the flange on the outer wall of the casing and having planar portions overhanging the flanges on the sealing ring to hold the device together as a unit and having oppositely disposed linear edges opposed to and engaging the planar faces on the sealing ring to prevent rotation of the sealing ring with respect to the shell.

References Cited in the file of this patent
UNITED STATES PATENTS

| | | |
|---|---|---|
| 2,464,989 | Payne | Mar. 22, 1949 |
| 2,498,739 | Magnesen | Feb. 28, 1950 |
| 2,505,189 | Krug | Apr. 25, 1950 |
| 2,592,728 | Payne | Apr. 15, 1952 |
| 2,598,886 | Brummer | June 3, 1952 |
| 2,717,790 | Chambers et al | Sept. 13, 1955 |
| 2,722,439 | Brummer et al | Nov. 1, 1955 |